United States Patent Office 3,505,188
Patented Apr. 7, 1970

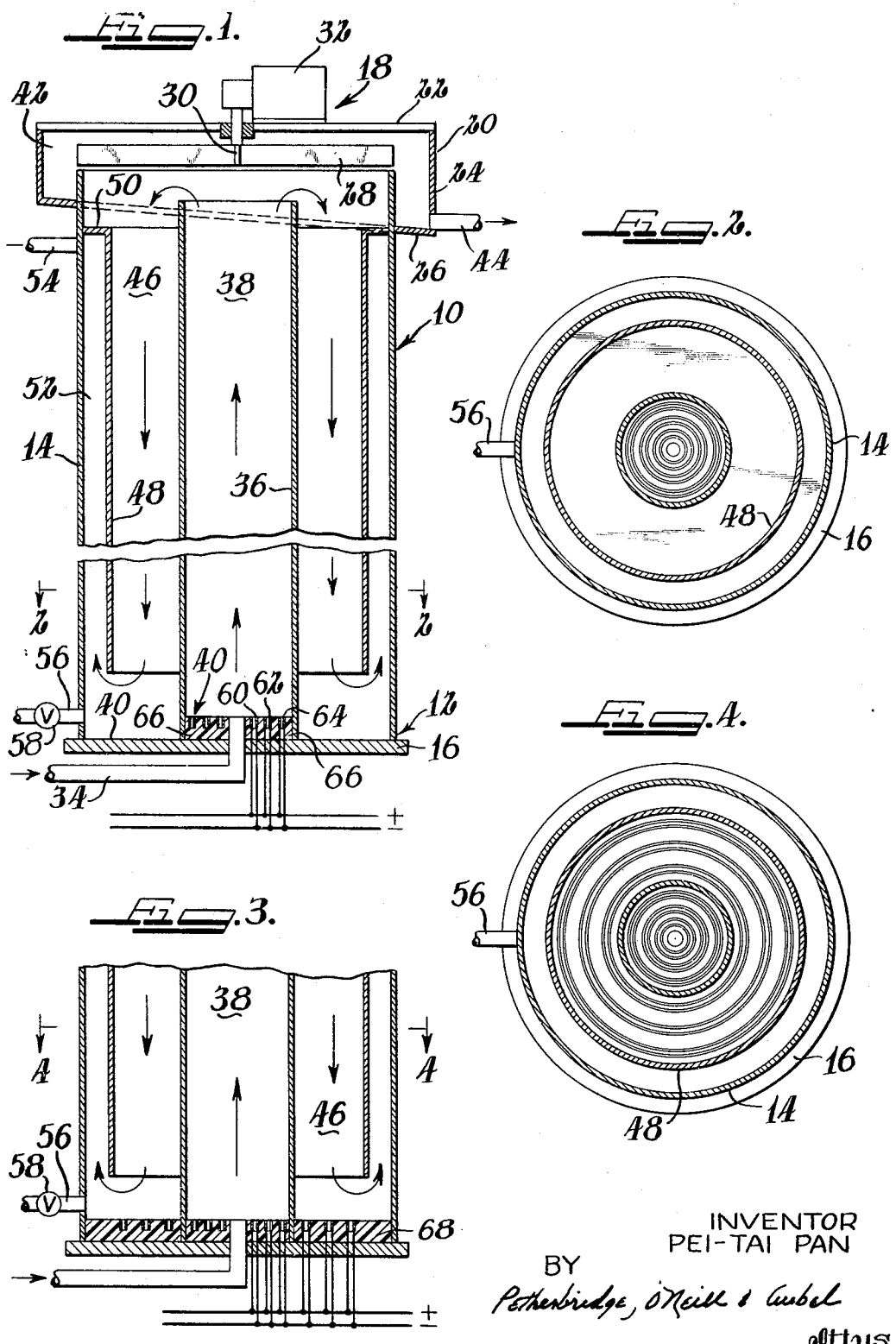

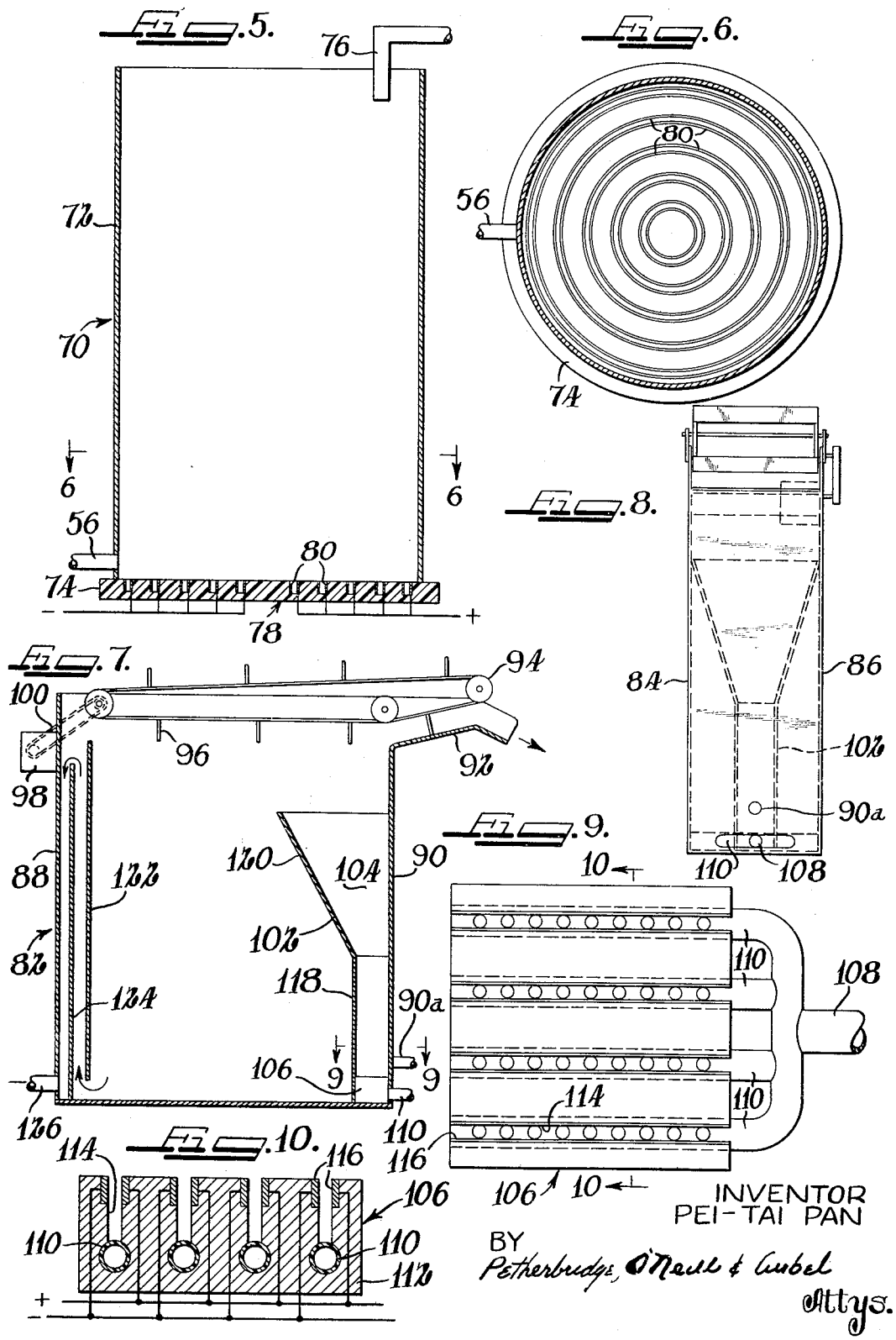

3,505,188
ELECTROLYTIC FLOTATION METHOD
AND APPARATUS
Pei-Tai Pan, Beloit, Wis., assignor to Fairbanks Morse
Inc., a corporation of Delaware
Filed June 18, 1965, Ser. No. 465,215
Int. Cl. C02b 1/82
U.S. Cl. 204—149                                25 Claims

ABSTRACT OF THE DISCLOSURE

Method and apparatus for electrolytic bubble-flotation separation of sewage wherein sewage is introduced above the vertically extended electrodes and the liquid flows unrestricted to top of the chamber for separation.

---

This invention relates to a method and apparatus for clarifying liquids by separation of solids and liquids or liquids from liquids and more particulate to a method and apparatus for removing finely divided solid particles from liquids, such as in sewage treatment.

The present invention is directed to the provision of a flotation tank in which flow of liquid is controlled so that individual suspended solid particles or clusters of solid particles formed by a suitable coagulant are carried to the surface of the liquid by means of a plurality of electrolytically formed bubbles to which the particles attach. In apparatus constructed in accordance with the principles of the present invention the flow of liquid within the tank is so controlled and the electrodes serving as a bubble source are so arranged with respect to the liquid flow path that efficient clarification is effected.

Electrolytically generated bubbles have been used heretofore in attempts to separate solids from liquids. In general, there has been little appreciation of the physical factor incident to efficient attachment of the bubbles to the solid particles and, as a result, devices of the prior art have been relatively inefficient. One fact that has not been fully realized is the importance of the integrity of the bubbles during their course of passage through the liquid. There has been little recognition of the fact that the carrying efficiency of the bubbles depends to a large extent on the normal tendency of bubbles to rise directly to the surface. As a result, the apparatus of the prior art has been characterized, in some instances, by the provision of bubbles formed by electrolysis whose surfaces are expected to entrain solid particles and carry these particles through tortuous passages before surfacing is permitted. During the course of flow through these tortuous passages the bubbles collide with the walls defining the passages and with each other with the result that the solid and gas particles are separated. In other instances, the liquid to be clarified is introduced into a flotation tank in such a way that the random currents are set up which so agitate the bubbles that the entrained solid particles separate. In some apparatus of the prior are, the liquid is agitated to separate the solid particles from the bubbles for subsequent settling. In other prior art apparatus, having bubbles formed by electrolysis, the purpose of the electrolysis is the production of nascent oxygen for oxidation of organic material. Electrolysis has also been used to separate from solution materials of less specific gravity than water, such as soaps, greases and the like, and materials of greater specific gravity than water, such as some proteins. In the latter apparatus electrolysis is used to produce violent bubbling, which allows the lighter components to float to the surface and the heavy components to be deposited as sludge.

In apparatus having horizontally disposed electrodes the bubbles have a tendency to collide and agglomerate and join together. The particle adhesion capability of large size bubbles is known to be somewhat less than that of smaller size bubbles. Also, in prior devices using electrodes the sewage sometimes is permitted to flow through the electrodes with consequent plugging and fouling (coating) of electrode surfaces.

A principal object of the present invention is to provide a method and apparatus for purifying liquids in which the liquid containing finely divided solids is introduced into the bottom of a flotation tank, a plurality of small bubbles are electrolytically produced in close proximity to the liquid inlet, and in which means are provided for controlling the flow of the bubbles so that they move upwardly through the liquid in a predetermined path to carry finely divided solid particles held in suspension to the surface of the liquid from which they may be removed by skimming.

Another object of the invention is to provide apparatus of the stated type in which the electrodes are constructed and arranged so that scale may be easily removed therefrom merely by reversing the current.

A further specific object of the invention is to provide a flotation tank of the character indicated in which bubbles may be produced at low power cost, in which electrodes may be made of inexpensive material, such as nickel-plated steel, and in which the bubble concentration and distribution may easily be controlled by controlling the power input.

Another object of the invention is to provide a flotation tank which is characterized by greater efficiency with respect to prior art electrolytic bubble systems.

Another object of the invention is to provide an electrolytic flotation process of separating solids from liquids or for separating two immiscible liquids in which a plurality of hydrogen and oxygen gas bubbles are produced on the cathodes and anodes respectively of vertically disposed electrodes. The present process may be carried out in a batch or continuous manner.

A further object of the invention is to provide flotation apparatus for removing suspended solid particles from sewage liquid in which a plurality of gas bubbles are electrolytically produced for continuous non-turbulent flow upwardly through the sewage liquid in a defined chamber and in which the bubbles entrain the suspended particles and carry them to the surface of the liquid from which they may be removed by skimming or the like.

Another object of the invention is to devise a method in which solid suspended particles may be removed from sewage liquid by means of a plurality of electrolytically produced bubbles which flow in a confined path and carry the suspended particles to the surface of the liquid for subsequent removal.

These and other objects of the invention will be apparent as the description proceeds with reference to the accompanying drawings.

FIGURE 1 is an elevational sectional view of flotation apparatus made in accordance with the present invention;

FIGURE 2 is a sectional plan view taken substantially on line 2—2 of FIGURE 1;

FIGURE 3 is a fragmentary elevational sectional view of a modified form of the present invention;

FIGURE 4 is a sectional plan view taken substantially on line 4—4 of FIGURE 3;

FIGURE 5 is an elevational sectional view of another modified form of the present invention;

FIGURE 6 is a sectional plan view taken substantially on line 6—6 of FIGURE 5;

FIGURE 7 is an elevational sectional view of a still further modified form of the present invention;

FIGURE 8 is an end view of the flotation apparatus of FIGURE 7 as viewed from the right in that figure;

FIGURE 9 is a greatly enlarged plan view of an electrode assembly forming a part of the form of the invention illustrated in FIGURES 7 and 8; and FIGURE 10 is an elevational sectional view taken substantially on line 10—10 of FIGURE 9.

Referring to the drawings and more particularly to the preferred from of the invention illustrated in FIGURES 1 and 2, the preferred form of flotation apparatus made in accordance with the present invention is indicated generally by reference numeral 10 and includes a housing 12 including a cylindrical side wall 14, a disc-shaped bottom wall 16 and a scraping assembly 18.

The scraping assembly 18 includes a housing 20, a cylindrical side wall 24 and a sloping bottom wall 26 apertured for reception of the upper marginal edges of the side wall 14. A scraper 28 is mounted on a spider support member 22 for rotation with a shaft 30 operated by a motor 32. The walls of the housing 12 may be constructed of electrically conductive or non-conductive material, for example, plastic or metal, such as steel or the like.

The bottom wall 16 is apertured for a reception of an inlet pipe 34 through which liquid laden with suspended solid particles (liquid to be clarified, such as sewage) passes into the chamber defined by the housing 12. Surrounding the inlet pipe 34 is a baffle 36 which defines a subchamber 38. An electrode assembly 40 is disposed within the subchamber 38 in surrounding relation to the inlet pipe 34 for production of a plurality of tiny bubbles which flow upwardly within the subchamber 38 and to which cling the suspended particles during the course of their upward movement. The liquid substantially fills the housing 12. The scraper 28 is disposed in limited spaced relation to the level of the liquid so as to skim off accumulated solids from the liquid surface and impel these solids into an annular chamber 42 defined by the side wall 14, the side wall 24 and the bottom wall 26. The accumulated solids flow from the chamber 42 through a pipe 44 in the form of a sludge.

After leaving the top of the subchamber 38 the liquid flows downwardly through an annular passage 46 defined by the outer surface of the baffle 36 and by a baffle ring 48 having a radially outwardly extending flange 50 secured to the upper marginal inner edge of the wall 14. After flowing through the passage 46 the liquid flows upwardly through an annular channel 52 defined by the outer surface of the ring 48 and the annular surface of the wall 14. At the top of the channel 52 is an outlet pipe 54. At the bottom of the housing 12 is a drain 56 controlled by a valve 58.

As shown best in FIGURE 2, the electrode assembly 40 includes a plurality of concentric radially spaced and vertically disposed circular electrodes 60, 62 and 64. The electrodes may be constructed of any electrically conductive material, such as stainless steel, nickel-plated steel, platinum or the like and are received for vertical disposition in a mounting block 66 of any suitable dielectric material, such as plastic or the like.

In FIGURE 3 is illustrated a modified form of the present invention which is similar in all respects to the form of the invention of FIGURE 1 with the exception that a second annular electrode bank 68 having vertically extending electrodes is disposed within the tank 12 in surrounding relation to the subchamber 38 to form bubbles in the liquid that has passed over the top marginal edge of the baffle 36. These bubbles tend to rise within the passage 46, entrain solid particles still remaining in the liquid and carry the partcles to the surface for removal as in the form of the invention illustrated in FIGURE 1.

FIGURE 5 illustrates another modified form of the present invention suitable for use in carrying out a batch clarification rather than a continuous clarification as in the forms of the invention illustrated in FIGURES 1 and 3. In this form of the invention a tank 70 is provided with a cylindrical side wall 72 of electrically conductive or nonconductive material, such as steel or the like, and a bottom wall 74 of a suitable dielectric, such as plastic or the like. The liquid to be clarified may be introduced into the tank 70 by means of an influent pipe 76. The bottom wall 74 forms a part of an electrode assembly 78 which includes a plurality of vertically extending electrodes 80. Energization of the electrode assembly 78 produces a plurality of gas bubbles by electrolysis of the water fraction of the liquid. As the gas bubbles rise the suspended solid particles attach to them and are floated to the surface. The electrode assembly may then be de-energized until the bulk of the solids have floated to the surface. Electrolysis may then be resumed, if desired, to effect flotation of the remaining suspended material and to compress the cake of solid material on the surface. Such additional electrolysis would also reduce the moisture content of the cake and thereby increase the concentration of solids.

A further modified form of the invention is illustrated in FIGURE 7. In this form of the invention there is provided a substantially rectangular housing 82 having spaced parallel side walls 84 and 86 and spaced parallel walls 88 and 90. The end wall 88 is illustrated as being higher than the end wall 90 which is formed with a spout 92 for removal of accumulated solid particles by means of an endless chain conveyor 94 having a plurality of paddles 96. The conveyor 94 is operated by a motor 98 by means of a belt or chain 100. Within the tank 82 is disposed a baffle enclosure 102 defining a subchamber 104 for substantially quiescent introduction of gas bubbles into the liquid to be clarified, such as sewage, supplied into the tank 82 by means of a conduit 90a disposed above an electrode assembly 106 (FIGURE 7), which is illustrated in detail in FIGURES 9 and 10.

The assembly 106 includes fluid feed pipe 108 having a plurality of parallel branches 110. The branch conduits 110 are illustrated as being received in openings in a dielectric block 112 and are provided with a plurality of longitudinally spaced openings in register with corresponding openings 114 in the block 112. The openings 114, as shown best in FIGURE 9, are so arranged as to project a clear electrolytic fluid, such as sodium hydroxide or sea water, upwardly between the vertically extending electrodes 116.

The electrolytic fluid is advantageously employed to increase conductivity of the liquid between electrodes thereby resulting in a lower overall power cost; to permit a controlled electrolyte environment thereby allowing use of chaper electrode material, such as nickel plated steel; to minimize fouling of the electrodes, and to maintain the electrodes substantially clean by the wash action of the electrolytic fluid passing between the electrodes. The electrode assembly 106 may be advantageously employed in any of the modifications illustrated in the drawings.

The baffle enclosure 102 includes a bottom portion 118 in which the assembly 106 is received and also an outwardly flaring top portion 120 provided for controlled dispersal of the entrained solid particles throughout substantially a greater area of the surface of the liquid. The flotation apparatus of the form of the invention shown in FIGURE 7 is intended for continuous operation.

The flow path of fluid in the chamber may be defined by a plurality of baffle plates, such as plates 122 and 124, which direct the clarified fluid to the discharge outlet 126 which may be located, as shown in FIGURE 7, adjacent the bottom of the assembly. The liquid tends to flow in a current downwardly to the right of the baffle 122, thence upwardly between the baffles 122 and 124 and thence downwardly between the baffle 124 and the end wall 88 and out through drain 126. If desired, additional electrodes may be placed in the bottom of the tank as in the form of the invention illustrated in FIGURE 3 for the purpose of removing remaining solids.

It will be appreciated that the bubble flow in the form of the invention in FIGURE 5 is in an upward direction only. The clarified liquid is drained from the tank after each batch operation is concluded.

The flotation method and apparatus of the present invention exhibits important advantages over flotation methods and apparatus heretofore known. One important advantage is that, with vertically disposed or extending electrodes, initially flow of bubbles is only in an upward direction so that dislodgement of the solid particles from the bubbles is minimized. Another advantage is that agitation of the liquid is kept to a minimum. Another important advantage is that the present process is characterized by a greater efficiency in removing finely divided suspended particles than flotation processes, such as sewage treatment processes, heretofore known.

The above described method and apparatus is intended to be merely illustrative of applicant's invention. It is intended that applicant be limited only by the scope of the attached claims.

I claim:

1. Apparatus adapted for removing solid particles from a sewage liquid comprising a housing defining a single flotation, electrolysis and solid particle separation chamber without flow restriction means at the upper portion of the chamber, electrolytic means disposed adjacent the bottom of said chamber and having the operative surfaces of the anodes and cathodes thereof respectively opposed to each other and extending vertically in said chamber for producing a plurality of upwardly rising bubbles, sewage liquid inlet means disposed above said electrolytic means, means at said upper portion of said chamber for removing solid particles from the surface of a sewage liquid in said chamber, and outlet means for removal of effluent liquid from said chamber.

2. Apparatus adapted for removing solid particles from a sewage liquid, comprising a housing defining a single floatation, electrolysis and solid particle separation chamber without flow restriction means at the upper portion of the chamber, an opening in said chamber for ingress of said sewage liquid, electrolytic means located below said opening and having the operative surfaces of the anodes and cathodes thereof respectively opposed to each other and extending vertically in said chamber for producing a plurality of upwardly rising bubbles in said chamber, a sewage liquid outlet for said chamber, and means for removing solid particles from the surface of said sewage liquid in said chamber.

3. Apparatus in accordance with claim 2 wherein said electrolytic means comprises a plurality of radially spaced vertically extending concentric circular banks of electrodes surrounding said inlet.

4. Apparatus according to claim 1 including means to introduce an electrolyte fluid between electrodes of said electrolytic means to enhance electrolysis.

5. Flotation apparatus for removing solid particles from sewage liquid comprising a housing defining a single flotation, electrolysis and solid particle separation chamber having a non-restricted upper end, a vertical subchamber disposed within said chamber, a liquid inlet disposed at the bottom of said chamber communicating with said subchamber, a liquid outlet spaced from the top of said chamber, electrolytic means located below said inlet adjacent the bottom of said chamber and having the operative surfaces of the anodes and cathodes thereof respectively opposed to each other and extending vertically in said chamber for producing a plurality of bubbles in the liquid to float solid particles to the surface thereof, means for effecting a tortuous flow of the liquid from said subchamber to said outlet, and means for removing solid particles from the surface of the liquid.

6. Apparatus adapted for removing solid particles from sewage liquid comprising a housing defining a single flotation, electrolysis and solid particle separation chamber having a non-restricted upper end, said chamber having an opening at the bottom thereof, means within said chamber defining an elongated first passage surrounding said opening for directing liquid upwardly towards the top of said chamber, means surrounding said passage in spaced relation thereto and defining a second passage for flow of clarified liquid downwardly towards the bottom of said chamber, said last mentioned means being spaced from said housing to define with said housing a third passage in communication with said second passage for subsequent flow of said clarified liquid from said second passage upwardly towards the top of said chamber, an outlet for said housing communicating with said third passage, and electrolytic means disposed in the bottom of said first passage and defining the bottom surface of said first passage and having the operative surfaces of the anodes and cathodes thereof respectively opposed to each other and extending vertically in said first passage for electrically producing a plurality of bubbles in at least said first passage.

7. Apparatus of claim 6 wherein said electrolytic means are disposed in said housing below said inlet for liquid to be clarified.

8. Apparatus adapted for removing finely divided suspended solid particles from sewage liquid comprising a tank forming an outer chamber, means within said outer chamber forming an inner chamber defining a single flotation, electrolysis and solid particle separation chamber having a non-restricted upper end, inlet means for introducing sewage liquid to said inner chamber, above the bottom surface of said inner chamber, for flow into said outer chamber, electrolytic means in said inner chamber defining the bottom surface of said chamber and having the operative surfaces of the anodes and cathodes thereof respectively opposed to each other and extending vertically in said chamber for producing a plurality of fine bubbles, said inner chamber being constructed to direct said bubbles in an upwardly flowing stream in which the bubbles entrain finely divided solid particles and carry the particles to the surface of the liquid, and means for removing accumulated solid particles from the upper surface of the liquid in said outer chamber.

9. The apparatus of claim 8 wherein said inner chamber includes inner chamber defining wall means located adjacent said inlet and having an outwardly flaring open upper end for directing flow of sewage liquid upwardly.

10. The apparatus of claim 8 wherein said anodes and said cathodes are carried in a dielectric block in said chamber having apertures between said anodes and said cathodes for introduction of an electrolytic fluid between said anodes and said cathodes.

11. The apparatus of claim 8 including baffle means for directing flow of clarified sewage fluid along a tortuous path in said outer chamber to said outlet.

12. Apparatus adapted for removing solid particles from sewage liquid comprising a housing having an outer wall and a spaced inner wall defining an outer fluid flow chamber, said housing having an unrestricted open end and having an inlet opening for introducing fluid above the bottom surface of said housing, means within said chamber including a wall defining an elongated inner fluid flow chamber surrounding said inlet for directing liquid to be clarified upwardly from said inlet towards the top of said housing, said inner wall of said housing and wall of said means being spaced to define therebetween a third liquid flow chamber for directing liquid flow for said inner chamber downwardly towards the bottom of said housing, said wall of said means and said wall of said housing directing flow of liquid from said third chamber to said outer liquid flow chamber wherein liquid is directed upward towards the top of said chamber, an outlet in said housing for clarified fluid communicating with said outer chamber and electrolytic means located and defining the bottom surface of said inner chamber and having the operative surfaces of the anodes and cathodes thereof respectively opposed to each other and extending vertically in said first passage for electrically producing bubbles in said inner chamber.

13. Apparatus adapted for removing finely divided suspended solid particles from liquid comprising a tank forming an outer chamber having an unrestricted upper end, means within said outer chamber forming an inner chamber having an unrestricted upper end, inlet means for introducing fluid above the bottom surface of said inner chamber for flow into said outer chamber, electrolytic means defining the bottom surface of said inner chamber and having the operative surfaces of the anodes and cathodes thereof respectively opposed to each other and extending vertically in said inner chamber for producing a plurality of fine bubbles, said inner chamber being constructed to direct said bubbles in an upwardly flowing stream in which the bubbles entrain finely divided particles and carry the particles to the surface of the liquid, and means for removing accumulated solid particles from the surface of the liquid.

14. The apparatus of claim 13 wherein said inner chamber includes inner chamber defining wall means located adjacent said inlet and having an outwardly flaring open upper end for directing flow of liquid upwardly.

15. The apparatus of claim 13 wherein said electrodes are carried in a dielectric block in said chamber having apertures between said electrodes for introduction of an electrolyte fluid between said electrodes.

16. The apparatus of claim 13 including baffle means for directing flow of fluid along a tortuous path in said chamber between said inlet means and said outlet.

17. A method for floating finely divided suspended particles to separate said particles from liquid comprising the steps of providing a housing, providing means within said housing defining a single flotation, electrolysis and particle separation chamber having an unrestricted upper end introducing the liquid into said chamber above the bottom surface thereof, electrolytically forming from means defining the bottom surface of said chamber and having the operative surfaces of the anodes and cathodes thereof respectively opposed to each other and extending vertically in said chamber a plurality of bubbles for upward flow through the liquid to entrain finely divided particles and carry said particles to the surface of the liquid, feeding the clarified liquid to an outlet, and removing the solid particles from the upper surface of the liquid.

18. A method for floating finely divided particles to separate the particles from a liquid comprising the steps of providing a housing defining a single flotation, electrolysis and solid particle separation chamber having an unrestricted upper end and having means defining a vertical subchamber within said chamber, introducing the liquid into said subchamber adjacent the bottom surface thereof, electrolytically forming in the liquid within said subchamber from means defining the bottom surface of said subchamber and having the operative surfaces of the anodes and cathodes thereof respectively opposed to each other and extending vertically in said subchamber a plurality of bubbles to carry solid particles to the surface of the liquid, skimming the particles from the surface of the liquid, providing means defining an annular passage surrounding said subchamber for flow of the clarified liquid downwardly, and feeding the clarified liquid from said passage upwardly to an outlet from the chamber.

19. A method adapted for removing finely divided solid particles from liquid comprising the steps of introducing the liquid into a flotation tank having an unrestricted upper end and an inlet at the bottom thereof located to introduce the liquid above the bottom surface of said tank and having an outlet adjacent the top thereof, providing baffle means surrounding the inlet and forming an elongated subchamber so that the liquid flows upwardly at a predetermined distance, providing an electrolytic source defining the bottom surface of the chamber and having the operative surfaces of the anodes and cathodes thereof respectively opposed to each other and extending vertically in said chamber for forming a plurality of relatively small bubbles which travel upwardly and attach to the solid particles to carry the particles to the surface of the liquid, and skimming the accumulated solid particles from the liquid surface.

20. A method for removing finely divided solid particles from sewage liquid comprising the steps of introducing the liquid into a single flotation electrolysis and solid particle separation tank having an unrestricted upper end and having a liquid inlet at the bottom thereof and a clarified liquid outlet adjacent the top thereof, providing baffle means surrounding the inlet forming an elongated subchamber so that the liquid flows upwardly a predetermined distance, providing electrolytic means defining the bottom surface of the subchamber and having the operative surfaces of the anodes and cathodes thereof respectively opposed to each other and extending vertically in said subchamber for forming a plurality of relatively small bubbles which travel upwardly through the subchamber and attach to the solid particles to carry the particles to the surface of the liquid, providing a baffle defining a passage surrounding said subchamber for flow of the liquid downwardly, said last-named baffle further defining a passage surrounding said passage for subsequent flow of the clarified liquid upwardly to the outlet, and skimming the accumulated particles from the surface of the liquid.

21. A method for removing suspended solid particles from liquid comprising the steps of providing a single flotation electrolysis and solid particle separation chamber having an unrestricted upper end, introducing the liquid into the chamber from a location above the bottom surface thereof, providing electrolytic means defining the bottom surface of the chamber and having the operative surfaces of the anodes and cathodes thereof respectively opposed to each other and extending vertically in said subchamber for production of a plurality of fine bubbles for free flow to the surface of the liquid, intermittently energizing the electrolytic means to produce bubbles for attachment to the particles during the course of their upward flow, and removing the solid particles from the surface of the liquid.

22. A method adapted for separating finely divided suspended solid particles comprising the steps of providing a tank defining a chamber, providing an electrolysis assembly as the bottom surface of the chamber including a plurality of spaced vertical electrodes, introducing liquid with solid particles therein to be clarified into the chamber above said electrodes, energizing said electrodes to produce bubbles in said liquid, and removing accumulated solid particles from the surface of the liquid.

23. The method of claim 22 including the step of introducing an electrolytic liquid between the electrodes to enhance electrolysis.

24. A method adapted for separating two immiscible liquids comprising the steps of introducing the mixture of said liquids into a chamber, generating electrolytically a plurality of bubbles in the mixture from below the location of introduction of said mixture and adjacent the bottom of the chamber for separating the liquids and for moving the particulate liquid upward to the top of the chamber, and separately removing the separated liquids from the chamber.

25. Apparatus adapted for removing solid particles from liquid comprising a housing defining a chamber, said chamber having an opening at the bottom thereof, means within said chamber defining an elongated first passage surrounding said opening for directing liquid upwardly towards the top of said chamber, means surrounding said passage in spaced relation thereto and defining a second passage for flow of said liquid downwardly towards the bottom of said chamber, said last mentioned means being spaced from said housing to define with said housing a third passage in communication with said second passage for subsequent flow of said liquid from said second passage upwardly towards the top of said chamber, an outlet for said housing communicating with said third passage, and electrolytic means having the operative surfaces of the anodes and cathodes thereof respectively opposed to each other and extending vertically in said chamber for electrically producing a plurality of bubbles in at least said first passage.

References Cited

UNITED STATES PATENTS

| | | | |
|---|---|---|---|
| 669,439 | 3/1901 | Frasch | 204—263 |
| 1,405,117 | 1/1922 | Harris | 204—302 |
| 1,579,138 | 3/1926 | Petz | 204—256 |
| 1,906,914 | 5/1933 | Mason | 204—149 |
| 2,456,897 | 12/1948 | Smiley et al. | 204—232 |
| 2,855,357 | 10/1958 | Stenzel | 204—302 |
| 3,035,992 | 5/1962 | Hougen | 204—149 |
| 3,147,217 | 9/1964 | Halton | 210—44 |

JOHN H. MACK, Primary Examiner

A. C. PRESCOTT, Assistant Examiner

U.S. Cl. X.R.

204—232, 275; 210—44, 221